US006407180B1

(12) United States Patent
Wideman et al.

(10) Patent No.: US 6,407,180 B1
(45) Date of Patent: Jun. 18, 2002

(54) GROUND RECYCLED RUBBER AND ARTICLE OF MANUFACTURE, INCLUDING TIRES, HAVING A COMPONENT COMPRISED THEREOF

(75) Inventors: Lawson Gibson Wideman, Hudson; Paul Harry Sandstrom, Tallmadge; George Frank Balogh, North Canton, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/594,962

(22) Filed: Jun. 15, 2000

(51) Int. Cl.[7] ............................. C08F 36/06; C08F 36/08; C08F 8/34; C08K 3/04; C08K 5/36; C08K 5/17; C08L 9/00; C08L 9/06; B60C 11/00

(52) U.S. Cl. ................... 525/332.7; 524/252; 524/495; 152/209.1

(58) Field of Search ................. 524/252, 495; 523/152; 525/332.7; 152/209.1

(56) References Cited

U.S. PATENT DOCUMENTS 4,764,547 A * 8/1988 Hatanaka et al. ............ 523/215
5,510,419 A * 4/1996 Burgoyne et al. ............. 525/98
5,883,139 A * 3/1999 Wideman et al. .......... 521/43.5
6,077,874 A   6/2000 Wideman et al. .......... 521/42.5
6,207,723 B1 * 3/2001 Matsuhita et al. ............ 521/41

FOREIGN PATENT DOCUMENTS

EP   972792    * 1/2000
JP   71020886  * 12/1966
JP   01014256  * 1/1989

OTHER PUBLICATIONS

English Translation of JP 71020886 (1966).*
English Translation of JP 01014256 (1989).*

* cited by examiner

Primary Examiner—Vasu Jagannathan
Assistant Examiner—Callie E. Shosho
(74) Attorney, Agent, or Firm—Henry C. Young, Jr.

(57) ABSTRACT

The invention relates to ground sulfur pre-vulcanized rubber (e.g. recycled cured rubber) which is blended with a preformed composite of carbon black and tris (2-aminoethyl) amine following which it is sulfur vulcanized. The invention also relates to articles of manufacture, including tires, which have at least one component as a rubber composition comprised of such treated pre-vulcanized particulate rubber.

13 Claims, No Drawings

GROUND RECYCLED RUBBER AND ARTICLE OF MANUFACTURE, INCLUDING TIRES, HAVING A COMPONENT COMPRISED THEREOF

FIELD

The invention relates to ground sulfur pre-vulcanized rubber (e.g. recycled cured rubber) which is blended with a pre-formed composite of carbon black and tris(2-aminoethyl) amine following which it is sulfur vulcanized. The invention also relates to articles of manufacture, including tires, which have at least one component as a rubber composition comprised of such treated recycled particulate rubber.

BACKGROUND OF THE INVENTION

Various articles, including tires and industrial products have at least one component as a sulfur vulcanized rubber, particularly of various diene-based rubbers. It is sometimes desired to re-use, or recycle, the vulcanized rubber of one or more of such components.

The vulcanized rubber desired to be recycled may be in a form of a manufactured article such as a pneumatic tire, industrial conveyor or power transmissions belt, hose and the like. Scrap pneumatic tires are especially large source of such vulcanized rubber.

The scrap vulcanized rubber may be prepared for re-use by being either by physically grinding it down to relatively small sizes and reclaimed by reducing its chemical character by various processes in which the rubber is conventionally de-vulcanized.

Alternatively, the scrapped vulcanized rubber may be reclaimed by grinding it down to extremely small particles and mixing it as a compounding ingredient, usually as a filler, with other rubbers and rubber compounding ingredients to form a rubber composition followed by sulfur vulcanizing the resultant rubber composition. In this case, the recycled rubber remains vulcanized but is in a form of a fine, particulate rubber.

In this description, the terms "recycle" and "recycled rubber" are used somewhat interchangeably and are intended to relate to vulcanized and sulfur pre-vulcanized rubber compositions unless otherwise designated.

Generally, such recycled, rubber, unlike conventional pre-vulcanized rubber compositions, is a complex mixture of largely unknown diene-based elastomers of compounding ingredients, possibly bits of textile fiber, and the like.

It has been observed that, after adding sulfur and accelerator to recycle rubber, followed by its revulcanization, the resulting physical properties, such as tensile and elongation, are usually lower than the corresponding properties of the original vulcanized rubber from which it was derived.

A process of improving properties of ground recycled sulfur pre-vulcanized rubber through use of a tris (2-aminoethyl) amine has been disclosed in EP 0972792 application published on or about Jan. 19, 2000.

However, it is considered herein that it may be beneficial to utilize such tris amine as a pre-formed composite of the tris amine in a dissociated form on the surface of a rubber reinforcing carbon black to thereby form a strong amine bond to the highly dispersible carbon black prior to blending the composite with one or more sulfur pre-vulcanized elastomers.

In the description of this invention, the term "phr" relates to parts by weight in a rubber composition of an ingredient therein per 100 parts of elastomer. The terms "rubber" and "elastomer" may be used interchangeably unless otherwise indicated. The terms "rubber composition" and "compound" may be use interchangeably unless otherwise indicated. The terms "vulcanize" and "cure" may also be used interchangeably unless otherwise indicated.

SUMMARY OF THE INVENTION

The present invention relates to a process for improving the properties of ground recycled sulfur vulcanized rubber.

DETAILED DESCRIPTION OF THE INVENTION

In accordance with this invention, a process for preparation of sulfur vulcanized rubber composition comprising:

(A) homogeneously blending a pre-formed composite of carbon black and tris(2-aminoethyl) amine, with a particulate, sulfur pre-vulcanized rubber composition, wherein said pre-formed composite has a weight ratio of said amine to carbon black in a range of about 0.1 to about 12, and in an amount of said amine to provide from about 0.18 to about 10, alternatively about 1 to about 5, phr of said tris(2-aminoethyl) amine in said particulate sulfur pre-vulcanized rubber composition, and wherein said particulate sulfur pre-vulcanized rubber composition is of a particle size of less than 420 microns, to form a treated vulcanized rubber composition thereof;

(B) mixing about one to about 40 parts by weight of said treated pre-vulcanized rubber composition with 100 parts by weight of at least one unvulcanized rubber to form a rubber composition blend comprised of said unvulcanized rubber and said treated pre-vulcanized rubber.

(C) heating said rubber composition blend for a time sufficient and at a suitable temperature to vulcanize the unvulcanized rubber composition contained therein.

In further accordance with this invention a rubber composition prepared by the method of this invention is also provided.

In additional accordance with this invention, an article of manufacture which contains at least one component comprised of such rubber composition is provided.

In additional accordance with this invention, a tire which contains at least one component comprised of such rubber composition is provided. Such tire component may be, for example, a tire tread.

In practice, said particulate, sulfur pre-vulcanized rubber composition should have a maximum particle size of about 420 microns (40 mesh). Any particles greater than this are considered herein to render it impractical for subsequent mixing with the treated vulcanized rubber/unvulcanized rubber. In general, the individual sulfur pre-vulcanized rubber particles should preferably have a maximum particle size of about 250 microns (60 mesh) and preferably less than about 177 microns (80 mesh). Preferably, the individual particle size ranges from about 250 microns (60 mesh) to about 74 microns (200 mesh).

It is a significant aspect of this invention that the tris (2-aminoethyl) amine is provided as a pre-formed composite of a dissociated form of the amine with a particulate rubber reinforcing carbon black.

The use of such composite is particularly beneficial in order to reduce volatility of the amine, which therefore is considered herein to facilitate a blending of more highly dispersed and dissociated form of the tris (2-aminoethyl) amine with a sulfur pre-vulcanized rubber.

The use of the tris amine as a component of the preformed carbon black composite is considered herein to be beneficial by providing the tris amine as being bound in a highly dispersed form on the carbon black and to thereby enhance a relatively strong and efficient interaction with the particulate, sulfur-vulcanized rubber with which it is blended.

Use of a composite blending procedure with the recycle rubber is considered herein to be particularly advantageous as an alternative to use of a volatile organic solvent carrier for the tris (2-aminoethyl) amine for other various reasons, such as, for example, safety and environmental considerations.

Representative of various particulate carbon blacks for preparation of the composite are, for example, conventional rubber reinforcing carbon blacks with ASTM numbered designations ranging from N110 to N991.

The composite of carbon black and tris (2-aminoethyl) amine may be suitably prepared by highly dispersing the amine onto the surface of the carbon black to thereby maximize the interaction of the amine with the surface of the carbon black.

The dispersing of the tris amine onto the carbon black surface may be accomplished by, for example, by use of a volatile organic solvent which can readily be removed by evaporation, or by spraying or atomizing the tris amine onto the surface of the carbon black.

In the practice of this invention, the amine/carbon black composite is dispersed in the particulate sulfur pre-vulcanized rubber in a manner that the tris (2-aminoethyl) amine itself is dispersed in the pre-vulcanized rubber in an amount ranging from 0.18 to 10.0 phr of the amine. Preferably, the level of tris (2-aminoethyl) amine that is dispersed ranges from 0.36 to 5.0 phr, based upon the pre-vulcanized rubber.

For the purpose of the description of this invention, the particulate sulfur pre-vulcanized rubber having been treated, or blended, with the pre-formed composite of the dissociated tris (2-aminoethyl) amine and carbon black may sometimes be referred to herein as "treated sulfur-vulcanized rubber" or "treated recycled vulcanized rubber".

In the practice of this invention, the treated sulfur pre-vulcanized rubber may be mixed with unvulcanized rubber, particularly unvulcanized diene-based elastomers. For such practice, as hereinbefore from about one to about 40 parts by weight of the treated rubber may be mixed with 100 parts by weight of at least one unvulcanized rubber to form a recycle/unvulcanized rubber compound. Preferably, from 2 to 30 parts by weight of the treated rubber is mixed with 100 parts by weight of at least one unvulcanized rubber.

Representative examples of such unvulcanized rubber, or elastomer, are, for example, diene-based elastomers as homopolymers and copolymers of conjugated diene hydrocarbons such as, for example isoprene and 1,3-butadiene and copolymers of conjugated diene hydrocarbons with an aromatic vinyl compound such as styrene and alphamethhyl styrene, preferably styrene.

Representative of such elastomers are, for example, cis 1,4-polyisoprene (natural and synthetic), 1,4-cis-polybutadiene, butadiene/styrene copolymers, isoprene/butadiene copolymers, styrene/isoprene/butadiene terpolymers, and mixtures thereof In one aspect at least two unvulcanized elastomers may be blended with said treated recycled rubber. Such elastomers may be, for example, a combination of cis 1,4-polyisoprene rubber (natural or synthetic, with natural rubber being preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The synthetic cis 1,4-polyisoprene and the natural cis 1,4-polyisoprene rubber are well known to those having skill in the rubber art.

As can be appreciated by one skilled in the art, any of the above recited unvulcanized rubbers may be the same kind or different kind of rubber that is found in the ground recycled rubber.

It is to be appreciated that, in order to cure the rubber composition of the present invention, a sulfur vulcanizing agent is used. Examples of various sulfur vulcanizing agents include, for example, elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the type of rubber and the particular type of sulfur vulcanizing agent that is used. Generally speaking, the amount of sulfur vulcanizing agent ranges from about 0.1 to about 5 phr with a range of from about 0.5 to about 2 being preferred.

Conventional rubber additives may be incorporated in the rubber stock of the present invention. The additives commonly used in rubber stocks include fillers, plasticizers, waxes, processing oils, peptizers, retarders, antiozonants, antioxidants and the like. The total amount of filler that may be used may range from about 30 to about 150 phr, with a range of from about 45 to about 100 phr being preferred. Fillers include clays, calcium carbonate, calcium silicate, titanium dioxide and carbon black. Representative carbon blacks that are commonly used in rubber stocks include, for example, those with ASTM designations of N110, N121, N220, N231, N234, N242, N293, N299, S315, N326, N330, M332, N339, N343, N347, N351, N358, N375, N472, N539, N582, N630, N642, N660, N754, N762, N765, N774, N990 and N991. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, pentachlorophenol, saturated and unsaturated hydrocarbons and nitrogen bases, coal tar products, cumarone-indene resins and esters such as dibutyl phthalate and tricresol phosphate. Typical peptizers may be, for example, pentachlorothiophenol and dibenzamidophenyl disulfide. Such peptizers are used in amounts ranging from 0.1 to 1 phr. Common waxes which may be used include paraffinic waxes and microcrystalline blends. Such waxes are used in amounts ranging from about 0.5 to 3 phr. Materials used in compounding which function as an accelerator-activator includes metal oxides such as zinc oxide and magnesium oxide which are used in conjunction with acidic materials such as fatty acid, for example, tall oil fatty acids, stearic acid, oleic acid and the like. The amount of the metal oxide may range from about 1 to about 14 phr with a range of from about 2 to about 8 phr being preferred. The amount of fatty acid which may be used may range from about 0 phr to about 5.0 phr with a range of from about 0 phr to about 2 phr being preferred.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 2.0, phr. In another embodiment, combinations of a primary and a secondary accelerator might be used with the secondary accelerator being used in a smaller, equal or greater amount to the primary accelerator. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate, disulfide or thiuram compound.

The rubber compounds of the present invention may also contain a cure activator. A representative cure activator is methyl trialkyl (C8–C 10) ammonium chloride commercially available under the trademark Adogeng® 464 from Sherex Chemical Company of Dublin, Ohio. The amount of activator may be used in a range of from 0.05 to 5 phr.

Siliceous pigments may be used in the rubber compound applications of the present invention, including pyrogenic and precipitated siliceous pigments (silica), although precipitated silicas are preferred. The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutyl phthalate (DBP) absorption value in a range of about 100 to about 400, and more usually about 150 to about 300.

Various commercially available silicas may be considered for use in this invention such as, only for example herein, and without limitation, silicas commercially available from PPG Industries under the Hi-Sil trademark with designations 210, 243, etc; silicas available from Rhodia, with, for example, designations of Zeosil 1165 MF and Zeosil 165 GR and silicas available from Degussa AG with, for example, designations VN2 and VN3, etc. Generally speaking, the amount of silica may range from 5 to 120 phr. The amount of silica will generally range from about 5 to 120 phr. Preferably, the amount of silica will range from 10 to 30 phr.

A class of compounding materials known as scorch retarders are commonly used. Phthalic anhydride, salicylic acid, sodium acetate and N-cyclohexyl thiophthalimide are known retarders. Retarders are generally used in an amount ranging from about 0.1 to 0.5 phr.

Conventionally, antioxidants and sometimes antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, paraphenylenediamines, polymerized trimethyldihydroquinoline and mixtures thereof. Specific examples of such antidegradants are disclosed in The Vanderbilt Rubber Handbook (1990), pages 282–286. Antidegradants are generally used in amounts from about 0.25 to about 5.0 phr with a range of from about 1.0 to about 3.0 phr being preferred.

The rubber compound of the present invention may be used as a wire coat or bead coat for use in a tire. For such purposes, cobalt compounds known in the art to promote the adhesion of rubber to metal may be blended with the rubber composition. Thus, suitable cobalt compounds which may be employed include cobalt salts of fatty acids such as stearic, palmitic, oleic, linoleic and the like; cobalt salts of aliphatic or alicyclic carboxylic acids having from 6 to 30 carbon atoms; cobalt chloride, cobalt naphthenate, cobalt neodecanoate, cobalt carboxylate and an organo-cobalt-boron complex commercially available under the designation Manobond C from Wyrough and Loser, Inc, Trenton, N.J.

Amounts of cobalt compound which may be employed depend upon the specific nature of the cobalt compound selected, particularly the amount of cobalt metal present in the compound. Since the amount of cobalt metal varies considerably in cobalt compounds which are suitable for use, it is most appropriate and convenient to base the amount of the cobalt compound utilized on the amount of cobalt metal desired in the finished stock composition.

The amount of the cobalt compound may range from about 0.1 to 2.0 phr. Preferably, the amount of cobalt compound may range from about 0.5 to 1.0 phr. When used, the amount of cobalt compound present in the stock composition should be sufficient to provide from about 0.01 percent to about 0.35 percent by weight of cobalt metal based upon total weight of the rubber stock composition with the preferred amounts being from about 0.03 percent to about 0.2 percent by weight of cobalt metal based on total weight of skim stock composition.

The sulfur vulcanizable rubber compound is conventionally cured at a temperature ranging from about 125° C. to 180° C. Preferably, the temperature ranges from about 135° C. to 160° C.

The mixing of the rubber compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

Various articles of manufacture, including tires and industrial products, may contain at least one component comprised of a rubber composition of this invention. For example, the rubber composition of this invention may be used in forming a composite with reinforcing material such as in the manufacture of tires, belts or hoses. Preferably, the composition of the present invention is in the form of a tire and more specially as a component of a tire, including, for example, one or more of the tire's tread, wirecoat, beadcoat, sidewall, apex, chafer and plycoat.

The following Examples are presented to further illustrate, although they are not intended to be limiting. The parts and percentages are by weight unless otherwise indicated.

EXAMPLE I

A pre-formed composite of carbon black and tris(2-aminoethyl) amine is prepared in the following manner:

To a one liter open top reactor was added 97.7 grams of tris (2-aminoethyl) amine and 100 milliliters of reagent grade acetone, followed by 97.7 grams of particulate N330 carbon black. The mixture was stirred for several minutes and the acetone was removed from the reactor under subatmospheric conditions at about 23° C. The mixture was further dried in a vacuum oven at about 100° C. at 29 inches of mercury for about two hours to a resulting composite of the tris (2-aminoethyl) amine/carbon black in a form of free-flowing gray-black granules.

Various amounts of the prepared tris-amine/carbon black composite were blended with rubber compositions which contained a particulate, ground, sulfur pre-vulcanized rubber and the samples thereof identified herein as Samples B through D.

Sample A is provided as a Control rubber composition without an addition of the tris amine/carbon black composite.

The rubber compositions were first mixed in the absence of sulfur and vulcanization accelerators (non-productive mixing) in an internal rubber mixer to about 150° C. followed by mixing sulfur and vulcanization accelerators therewith (productive mixing) in an internal rubber mixer to about 108° C.

The rubber compositions are illustrated in the following Table 1.

TABLE 1

| | Parts | | | |
|---|---|---|---|---|
| Material | Sample A Control | Sample B | Sample C | Sample D |
| Non-Productive Mixing for about 4.5 minutes to about 150° C. | | | | |
| Polybutadiene rubber[1] | 25 | 25 | 25 | 25 |
| Styrene/butadiene rubber[2] | 60 | 60 | 60 | 60 |
| 3,4-Polyisoprene rubber[3] | 15 | 15 | 15 | 15 |
| Recycle rubber[4] | 20 | 20 | 20 | 20 |
| Zinc oxide | 2.5 | 2.5 | 2.5 | 2.5 |
| Stearic acid | 2 | 2 | 2 | 2 |
| Carbon black[5] | 65 | 64.5 | 64 | 63 |
| Rubber processing oil[6] | 22 | 22 | 22 | 22 |
| Tris amine/carbon black Composite[7] | 0 | 1 | 2 | 4 |
| Microcrystalline wax | 1.5 | 1.5 | 1.5 | 1.5 |
| Antidegradants | 3.37 | 3.37 | 3.37 | 3.37 |
| Productive Mixing for about 1.6 minutes to about 108° C. | | | | |
| Sulfur | 1.4 | 1.4 | 1.4 | 1.4 |
| Accelerator(s) | 1.2 | 1.2 | 1.2 | 1.2 |

[1]Cis 1,4-polybutadiene rubber obtained as Budene 1207 from The Goodyear Tire & Rubber Company
[2]Styrene/butadiene rubber having a styrene content of about 12 percent obtained as Solflex 1216 from The Goodyear Tire & Rubber Company
[3]Synthetic 3,4-polyisoprene rubber from The Goodyear Tire & Rubber Company.
[4]Ground, sulfur pre-vulcanized rubber having a particle size of about 80 mesh obtained as GF80 from the Rouse Company. The GF80 recycle rubber (particulate, ground sulfur vulcanized rubber) contained about 88 percent by weight of particles that pass through 100 mesh, 95 percent by weight of particles that pass through 80 mesh and 100 percent by weight of particles that pass through a 60 mesh screen. A thermal gravimetric analysis (TGA) analysis for the GF80 recycle rubber is about 14 percent by weight volatiles, about 7 percent ash, about 30 percent carbon black and 50 percent rubber.
[5]N330 (an ASTM designation) carbon black
[6]Aromatic/naphthenic/paraffinic rubber processing oil
[7]Composite of tris (2-aminoethyl) amine and N330 carbon black as prepared in this Example

EXAMPLE II

Individual Samples A through D of Example I were cured (vulcanized) in a suitable mold for 60 minutes at about 120° C. and at about 135° C., respectively.

Various physical properties of the resulting Samples were determined, including the respective times to reach T25, T50, T80 and T90.

As is understood by one having skill in such art, the various T values represent times to reach a state of cure. For example, the T90 value represents the time for a respective rubber to reach 90 percent of the final cure state.

Various physical properties for Samples A through D prepared in Example I, when cured at a temperature of 120° C. as shown in the following Table 2 and when cured at a temperature of 135° C. as shown in the following Table 3.

The torque values shown in Tables 2 and 3 were measured at T90 percent.

TABLE 2

(Cured at 120° C.)

| Property | Sample A Control | Sample B | Sample C | Sample D |
|---|---|---|---|---|
| Min torque (dNm) | 12.88 | 12.7 | 12.88 | 13.95 |
| Max torque (dNm) | 29.57 | 35.47 | 36.49 | 34.94 |
| Delta torque (dNm) | 16.69 | 22.77 | 23.61 | 20.99 |
| Final torque (dNm) | 29.57 | 35.43 | 36.45 | 34.89 |
| TS1 (minutes) | 29.63 | 19.01 | 8.68 | 5.18 |
| T25 (minutes) | 39.15 | 24.98 | 13 | 7.9 |
| T50 (minutes) | 44.9 | 29.28 | 16.33 | 11.51 |
| T80 (minutes) | 52.18 | 37.9 | 24.7 | 22.63 |
| T90 (minutes) | 55.53 | 44.68 | 32.1 | 32.48 |

It can readily be seen from Table 2 that improved (faster) cure rates are obtained at 120° C. by using the amine/carbon black composition. This is considered herein to be significant because faster cure rates at lower temperatures can result in increasing a rate of production of manufactured goods, such as tires.

TABLE 3

(Cured at 135° C.)

| Property | Sample A Control | Sample B | Sample C | Sample D |
|---|---|---|---|---|
| Min torque (dNm) | 11.2 | 11.42 | 11.51 | 12.7 |
| Max torque (dNm) | 33.52 | 35.52 | 35.25 | 34.18 |
| Final torque (dNm) | 33.47 | 35.43 | 35.16 | 34.1 |
| Delta torque (dNm) | 22.32 | 24.1 | 23.74 | 21.48 |
| TS1 (minutes) | 12.21 | 7.43 | | |
| T25 (minutes) | 15.85 | 9.71 | 5.2 | 3.4 |
| T50 (minutes) | 18.86 | 11.48 | 6.5 | 4.81 |
| T80 (minutes) | 26.36 | 16.13 | 10.15 | 10.1 |
| T90 (minutes) | 33.46 | 21.26 | 14.56 | 16.18 |

It can readily be seen from Table 3 that even faster cure rates can be obtained at 135° C. as compared to the cure temperature of 120° C. This is considered herein to be significant because of importance conventionally assigned to accelerating a rate of production of cured rubber products.

In summary, significant benefits of using the prepared tris (2-aminoethyl) amine as a pre-formed composite with the particulate carbon black in a from of free-flowing granules instead of using the tris (2-aminoethyl) amine by itself in a rubber composition which contains a particulate sulfur pre-vulcanized rubber additive (recycle rubber) is considered herein to be novel and inventive because a strong interaction between the recycle rubber and the carbon black contained therein with the tris amine gives a rubber with accelerated cure rates at lower than conventional temperatures.

While certain representative embodiments and details have been shown for the purpose of illustrating the invention, it will be apparent to those skilled in this art that various changes and modifications may be made therein without departing from the spirit or scope of the invention.

What is claimed is:

1. A process for preparation of a sulfur vulcanized rubber composition which comprises:

(A) homogeneously blending a pre-formed composite of particulate rubber reinforcing carbon black and tris(2-amninoethyl) amine, with a particulate, ground sulfur pre-vulcanized rubber composition, wherein said pre-formed composite has a weight ratio of said amine to carbon black in a range of about 0.1 to about 12, and in an amount of said amine to provide from about 0.18 to about 10 phr of said tris(2-aminoethyl) amine in said particulate sulfur pre-vulcanized rubber composition, and wherein said particulate sulfur pre-vulcanized rubber composition is of a particle size of less than 420 microns, to form a treated pre-vulcanized rubber composition thereof;

(B) mixing about one to about 40 parts by weight of said treated pre-vulcanized rubber composition with 100 parts by weight of at least one unvulcanized rubber to form a rubber composition blend comprised of said unvulcanized rubber and said treated pre-vulcanized rubber;

(C) heating said rubber composition blend for a time sufficient and at a suitable temperature to vulcanize said unvulcanized rubber composition contained therein; and wherein for said pre-formed composite, said tris(2-aminoethyl) amine is bound in a highly dispersed, dissociated form on the surface of said particulate rubber reinforcing carbon black.

2. The process of claim 1 wherein said unvulcanized rubber is a diene-based elastomer selected from at least one of homopolymers and copolymers of at least one of isoprene and 1,3-butadiene and copolymers of at least one of isoprene and 1,3-butadiene with an aromatic vinyl compound selected from at least one of styrene and alphamethyl styrene.

3. A rubber composition prepared by the process of claim 2.

4. A tire which contains at least one component comprised of the rubber composition of claim 3.

5. A tire according to claim 4 wherein said component of said tire is a tread.

6. The process of claim 1 wherein said unvulcanized rubber is selected from at least two elastomers selected from cis 1,4-polyisoprene, 1,4-cis-polybutadiene, butadiene/styrene copolymer, isoprene/butadiene copolymer, 3,4-polyisoprene and styrene/isoprene/butadiene terpolymer.

7. A rubber composition prepared by the process of claim 6.

8. A rubber composition prepared by the process of claim 1.

9. An article of manufacture which contains at least one component comprised of the rubber composition of claim 8.

10. A tire which contains at least one component comprised of the rubber composition of claim 8.

11. A tire according to claim 10 wherein said component of said tire is a tread.

12. A tire which contains at least one component comprised of the rubber composition of claim 7.

13. A tire according to claim 12 wherein said component of said tire is a tread.

* * * * *